US012152573B2

(12) United States Patent
Chavez

(10) Patent No.: US 12,152,573 B2
(45) Date of Patent: Nov. 26, 2024

(54) MOBILE PUMP SYSTEM FOR MULTIPURPOSE WATER DELIVERY

(71) Applicant: Pump USA, LLC, Yuma, AZ (US)

(72) Inventor: John Bradly Chavez, Yuma, AZ (US)

(73) Assignee: Pump USA, LLC, Yuma, AZ (US)

( * ) Notice: Subject to any disclaimer, the term of this patent is extended or adjusted under 35 U.S.C. 154(b) by 0 days.

(21) Appl. No.: 18/482,748

(22) Filed: Oct. 6, 2023

(65) Prior Publication Data

US 2024/0044320 A1 Feb. 8, 2024

Related U.S. Application Data

(63) Continuation of application No. PCT/US2022/071601, filed on Apr. 7, 2022.

(60) Provisional application No. 63/188,306, filed on May 13, 2021, provisional application No. 63/172,068, filed on Apr. 7, 2021.

(51) Int. Cl.
*F04B 17/06* (2006.01)
*A01G 25/09* (2006.01)
*F04B 19/04* (2006.01)
*F04B 53/20* (2006.01)

(52) U.S. Cl.
CPC ............. *F04B 17/06* (2013.01); *A01G 25/09* (2013.01); *F04B 53/20* (2013.01); *F04B 19/04* (2013.01)

(58) Field of Classification Search
CPC .......... F04B 17/06; F04B 53/20; F04B 19/04; A01G 25/09
See application file for complete search history.

(56) References Cited

U.S. PATENT DOCUMENTS

| 5,181,833 A | 1/1993 | Villa et al. |
| 7,775,374 B1 * | 8/2010 | Barker ...................... C02F 9/20 |
| | | 210/259 |
| 8,491,276 B2 * | 7/2013 | Okabe ...................... C02F 1/18 |
| | | 202/205 |

(Continued)

FOREIGN PATENT DOCUMENTS

| CN | 2852665 Y | 1/2007 |
| CN | 204047153 U | * 12/2014 |

(Continued)

OTHER PUBLICATIONS

English Machine Translation of CN-204070001-U (Year: 2015).*

(Continued)

*Primary Examiner* — Nathan C Zollinger
(74) *Attorney, Agent, or Firm* — Schwegman Lundberg & Woessner, P.A.

(57) ABSTRACT

A mobile pump system can include a frame, a pump device connected to the frame and defining a pump inlet and a pump outlet. The pump device can provide water to a first outlet valve, a filtration system, and a manifold assembly. The manifold assembly can be supported by the frame, can be in fluid communication with the pump outlet, and can include the first outlet valve operable to selectively discharge unfiltered irrigation water from the pump outlet, a second outlet valve in fluid communication with the filtration system and operable to selectively discharge filtered irrigation water. The mobile pump system can further include a control system operably configured to be electrically connected to a power source and the pump device.

16 Claims, 5 Drawing Sheets

(56) References Cited

U.S. PATENT DOCUMENTS

| | | | | |
|---|---|---|---|---|
| 8,920,140 B2* | 12/2014 | Snyder | ............. | B01D 61/10 |
| | | | | 417/313 |
| 10,801,501 B2* | 10/2020 | Younker | ............. | A62C 3/07 |
| 2004/0108280 A1* | 6/2004 | Saraceno | ............. | C02F 9/20 |
| | | | | 210/748.11 |
| 2004/0262206 A1* | 12/2004 | Gettman | ............. | B01D 61/04 |
| | | | | 210/182 |
| 2009/0246039 A1 | 10/2009 | Haack et al. | | |
| 2013/0098642 A1* | 4/2013 | McLoughlin | ......... | F04B 49/022 |
| | | | | 417/63 |
| 2013/0098816 A1* | 4/2013 | Elfstrom | ............. | C02F 1/001 |
| | | | | 210/153 |
| 2014/0356197 A1* | 12/2014 | Hotovec | ............. | F04B 49/08 |
| | | | | 417/300 |

FOREIGN PATENT DOCUMENTS

| | | | | |
|---|---|---|---|---|
| CN | 204070001 U | * | 1/2015 | |
| CN | 204377597 U | * | 6/2015 | |
| CN | 103771653 B | * | 7/2016 | |
| CN | 107646282 A | * | 2/2018 | |
| CN | 207783859 U | * | 8/2018 | |
| CN | 208816104 U | | 5/2019 | |
| CN | 211983067 U | | 11/2020 | |
| JP | 2018034129 A | * | 3/2018 | |
| WO | WO-0244481 A1 | * | 6/2002 | ............. B01D 29/336 |
| WO | WO-2022217258 A1 | | 10/2022 | |

OTHER PUBLICATIONS

Human translation of CN204070001U (Year: 2015).*

"International Application Serial No. PCT/US2022/071601, International Search Report mailed Jun. 15, 2022", 3 pgs.

"International Application Serial No. PCT/US2022/071601, Written Opinion mailed Jun. 15, 2022", 8 pgs.

International Application Serial No. PCT/US2022/071601, International Preliminary Report on Patentability mailed Oct. 19, 2023, 10 pgs.

* cited by examiner

MOBILE PUMP SYSTEM FOR MULTIPURPOSE WATER DELIVERY

CROSS-REFERENCE TO RELATED APPLICATIONS

This application is a continuation of International Application No. PCT/US2022/071601, filed on Apr. 7, 2022, and published as WO2022/217258 on Oct. 13, 2022, which claims the benefit of U.S. Provisional patent application Ser. No. 63/172,068, filed on Apr. 7, 2021, and U.S. Provisional patent application Ser. No. 63/188,306, filed on May 13, 2021; the benefit of priority of each of which is hereby claimed herein, and which applications and publication are hereby incorporated herein by reference in their entireties.

BACKGROUND

Various types of mechanized irrigation techniques can be employed to direct water to an agricultural site, such as flood irrigation systems, drip irrigation systems, or sprinkler irrigation systems. In a flood irrigation system, water is generally pumped at a high volume directly into an agricultural field. In drip irrigation systems, water is generally pumped into a hose at a low volume and pressure to slowly exit, or "drip" through apertures positioned proximally to one or more plants. In sprinkler irrigation systems, water is through a series of pipes or hoses to one or more nozzles capable of discharging water in uniform pattern over a land surface. In all of the above examples, a pump device, such as a booster pump system, is used to draw water from one or more water sources including any of a well, a drainage ditch, a pond or river, or a dedicated water storage receptacle such as a water tank.

SUMMARY/OVERVIEW

A wide variety of agricultural irrigation systems and other agricultural industries, implements, equipment, such as fertilizer or chemical deployment systems, require the input of pressurized water, such as via a pump system operable to draw water from a water source. Additionally, many such agricultural irrigation systems can benefit from the water drawn from the water source to be filtered. For example, drip irrigation, sprinkler irrigation, or furrow irrigation systems can require the input of filtered water to prevent seeds, weeds, sand, or other debris from clogging various internal passageways, and filtered or treated water can also be desirable in fertilizer or chemical deployment systems.

Additionally, some produce, such as conventional or organic crops, can benefit from use of filtered and treated (e.g., sanitized or sterilized) irrigation water to inhibit the growth of bacteria or otherwise kill disease-causing pathogens present in the irrigation water. Further, many agricultural sites can benefit from more than one type of pressurized irrigation water to be provided simultaneously or interchangeably. For example, the discharge of unfiltered water for flood irrigation_ or the transfer of unfiltered water between a water source and a water storage receptacle, can be performed concurrently with the discharge of filtered or treated water for drip or sprinkler irrigation systems to thereby improve the efficiency of a farming operation.

However, existing agricultural pump systems include various shortcomings. First, existing pump systems are often physically large in scale and not easily moved: and can require a lengthy setup or assembly procedure. For example, many currently available pump systems can take a team of four or five persons a half-day or more of work to assemble on-site, and such systems often measure more than twenty-five to sixty feet in length. Such systems can also require multiple vehicles, or otherwise multiple delivery trips, to transport all necessary components to an agricultural site.

Second, existing agricultural pump systems can be limited in functionality. For example, currently available pump systems can deliver only unfiltered water or filtered water; and can require separate filtration or treatment systems to enable the pump system to discharge filtered or sanitized irrigation water. Such systems can also require periodic cleaning operations and other maintenance, during which the pump system may not be able to discharge water; or can discharge water only a reduced pressure or flow rate less than a pressure or flow required to maintain all operations of the pump systems. Additionally, may such pump systems lack a dedicated power source to generate electrical energy, and can therefore require an external electrical power to function, such as in the form of a wired connection to a vehicle or electrical generator.

Third, existing agricultural pump systems often require a significant amount of manual engagement. For example, such systems can require a user to manually operate valves, buttons, switches, or manually connect or disconnect pipes or hoses, to switch between one irrigation technique and another. Additionally, some irrigation filtration systems included in, or usable with, currently available pump systems necessitate the manual cleaning of a filter or filter assembly, the replacement of sand media based upon an amount of use, or the periodic input of various chemicals to treat irrigation water. Such systems can also lack the ability to capture or retain seeds or other relatively small common contaminants to prevent clogging of various passageways, nozzles, or other components. Any of the above examples can present a significant barrier to maintaining an efficient and cost-effective farming operation. Therefore, an improved agricultural pump system configured for the applications set out above is desirable.

The mobile agricultural pump system of the present disclosure can help to address the above issues, among others, such as by including a pump device, an integrated filtration and treatment system, a dedicated power source, and at least two outlet valves operable to allow a user to selectively discharge unfiltered wader, filtered water, or unfiltered and treated water independently or concurrently at a single pressure or flow rate, or at two or more different pressures or flow rates. In view of the foregoing, the mobile pump system can eliminate the need for any external or additional components and can provide the ability to support multiple types or irrigation techniques or systems, or water transfer between a water source and a water storage repository, concurrently. Additionally, the mobile pump system, including any components thereof, can be connected to and supported by a compact frame easily movable to an agricultural site, such as by positioning the frame on or within in a vehicle, or on trailer measuring about five feet wide by about seven feet in length. In view of the foregoing, the mobile pump system can substantially reduce the scale of an agricultural pump system, eliminate the need for any onsite assembly or separate transportation of any individual components, and reduce the number of persons needed to implement the mobile pump system to as few as one person.

Further, the filtration system of the mobile pump system can perform automated self-cleaning operations, maintain a consistent water pressure and flow rate during such self-cleaning operations, remove small contaminants such as weeds seeds without requiring the manual cleaning or the input of sand media or other materials, and sanitize water without requiring any input of chemicals. Finally, the mobile pump system can include a control system configured to enable a user to remotely monitor telemetry data associated with various components of, and control any operations of various components of, the mobile pump system, such via an external device to thereby reduce labor costs, improve operation efficiency, and improve user convenience.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

While the above overview discusses examples pertaining generally to pump systems engageable with agricultural irrigation systems, discussion of the following systems, devices, or methods are also applicable for use in other applications, such as to a wide variety of other agricultural implements requiring unfiltered, filtered, or sanitized water. The above overview is intended to provide an overview of subject matter of the present patent application. It is not intended to provide an exclusive or exhaustive explanation of the invention. The description below is included to provide further information about the present patent application.

Figure 1:
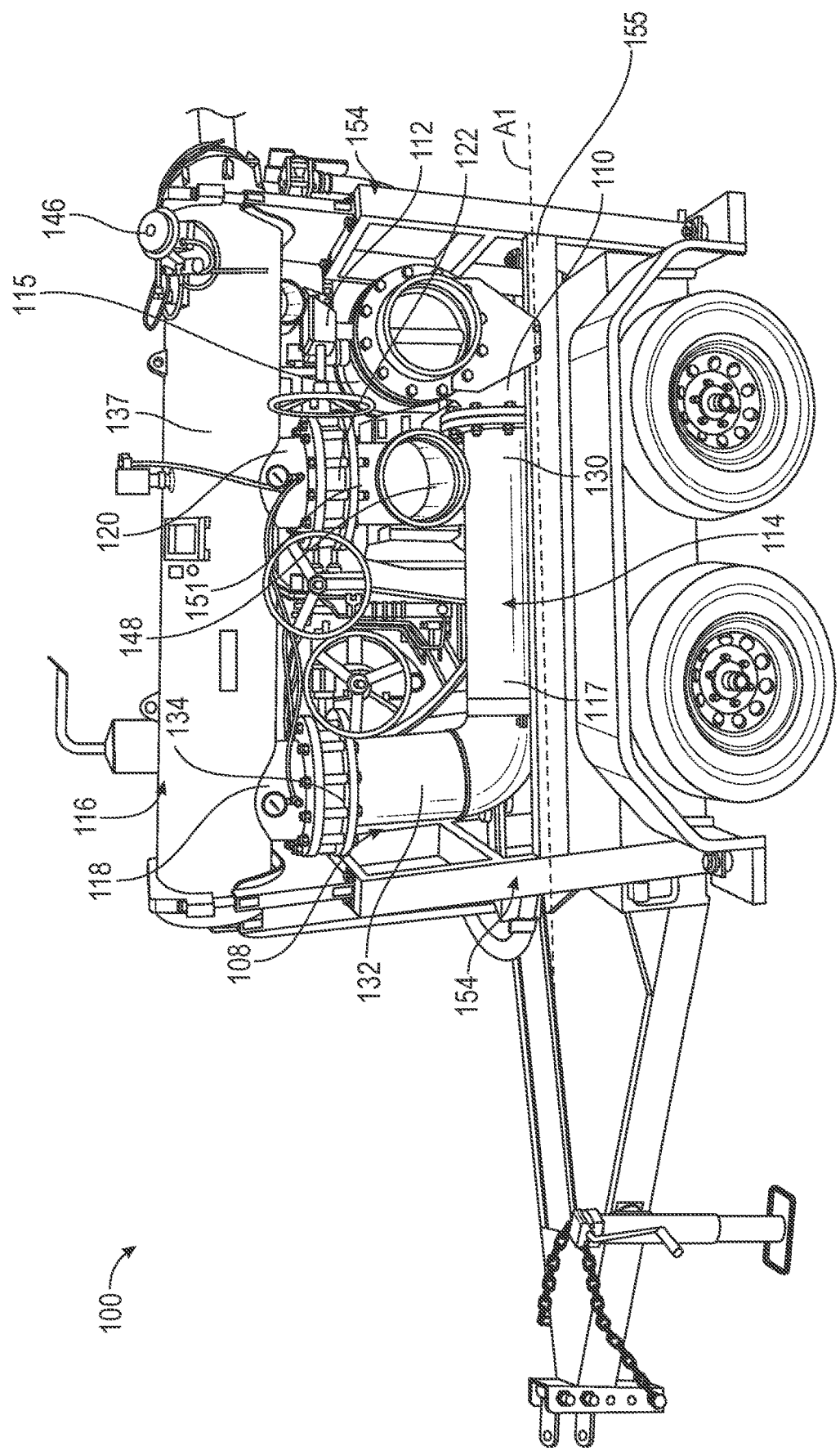
FIG. 1 illustrates a front perspective view of an example mobile pump system.
Figure 2A:
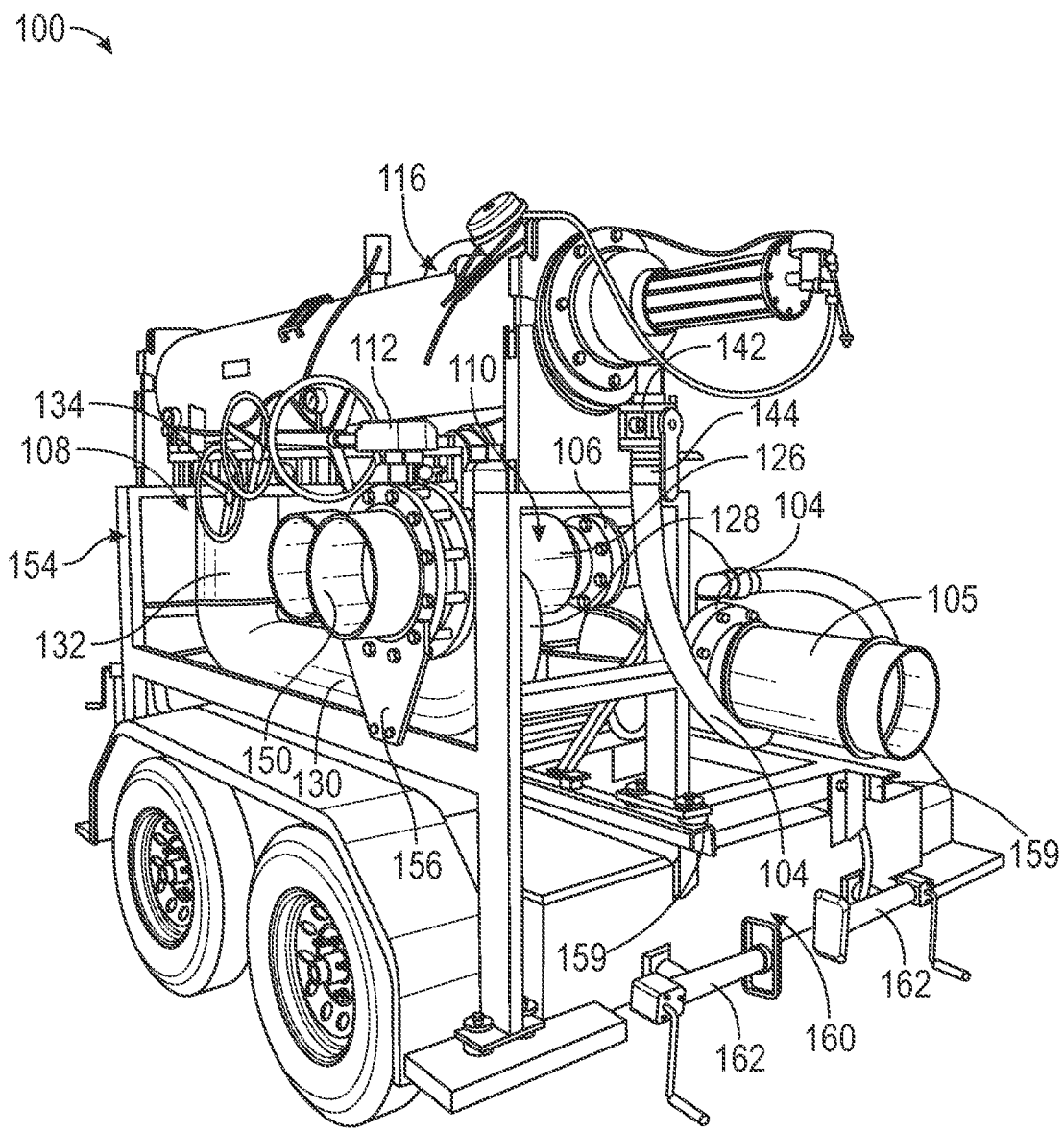
FIG. 2A illustrates a side perspective view of an example mobile pump system.
Figure 2B:
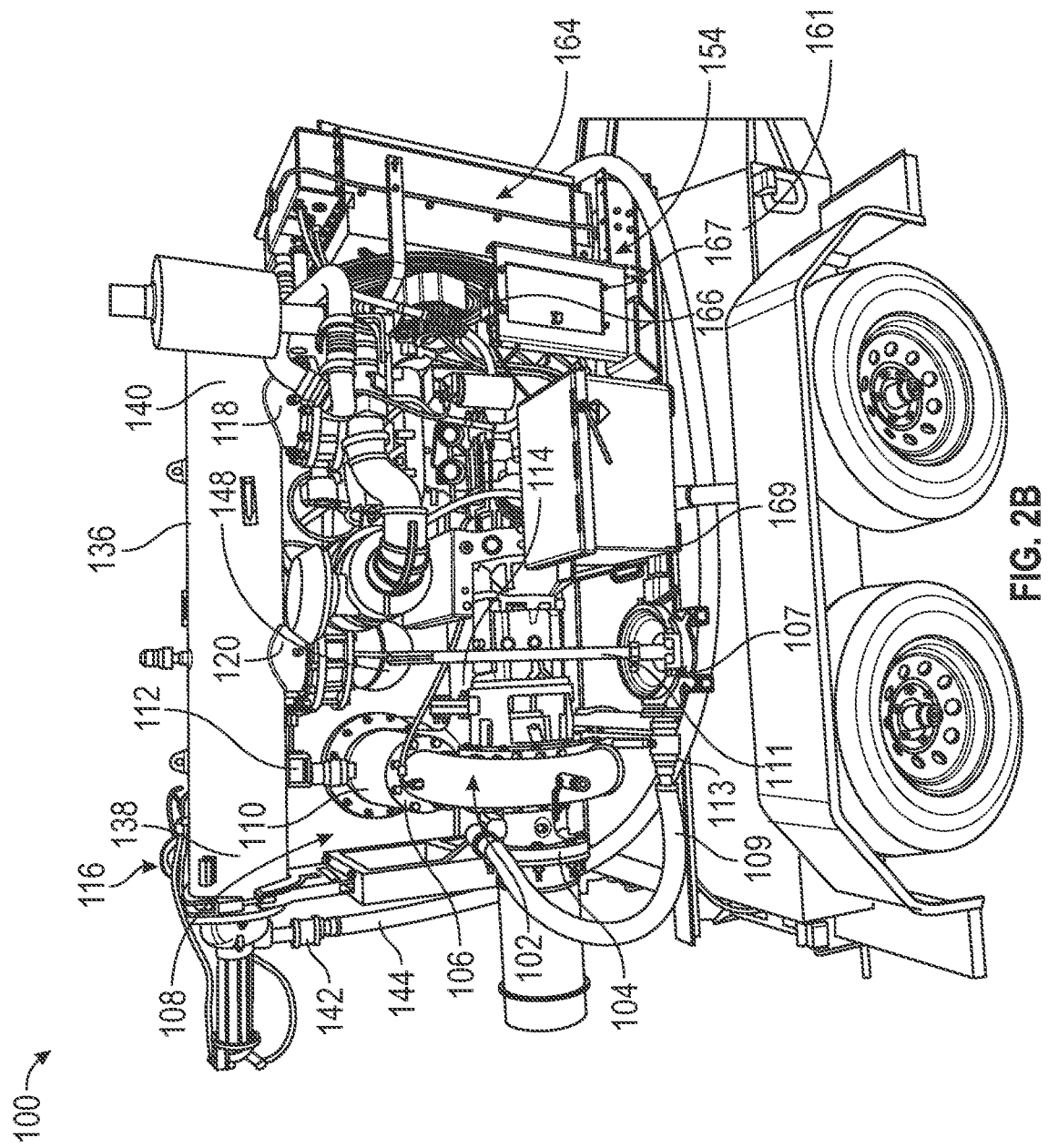
FIG. 2B illustrates a rear perspective view of an example mobile pump system.

FIG. 1 illustrates a front perspective view of an example mobile pump system 100. FIG. 2A illustrates a side perspective view of an example mobile pump system 100. FIG. 2B illustrates a rear perspective view of the mobile pump system 100. FIGS. 1-2B are discussed below concurrently. Also shown in FIG. 1 is a longitudinal axis A1. The mobile pump system 100 can include a pump device 102 (FIG. 2B). The pump device 102 can be a mechanically or electrically driven pump, such an as axial or a centrifugal pump. In a non-limiting example, the pump device 102 can be Cornell® W, Y, R, or H Series Pump. In another example, the pump device 102 can include an electric motor (not shown) operable to drive the pump device 102 via connection to a power source 164 (FIG. 2B) The pump device 102 can be configured to draw in water from a water source, such as at a rate of between, but not limited to, about 100 gallons per minute to about 11,000 gallons per minute. The pump device 102 can define a pump inlet 104 (FIG. 2A-2B). The pump inlet 104 can be in fluid communication with a water source (not shown). For example, the pump inlet 104 can include an extension 105 (FIG. 2A) configured to engage various fittings, pipes, hoses, conduits, or other tubular structures deployable to the water source to establish fluid communication therebetween.

In a non-limiting example, such as shown in FIG. 2B, the mobile pump system 100 can include a priming system 107 (FIG. 2B). The priming system 107 can be a mechanical priming system or an automated (e.g., electronically controlled) priming system. The priming system 107 can be configured to generate a vacuum within the pump inlet 104 to cause water from a water source to flow into the pump device 102, such as when the pump device 102 is dry, empty, or does not contain a suitable amount of water to operate. The priming system 107 can include a hose 109 (FIG. 2B), a handle 111 (FIG. 2B), and a valve 113 (FIG. 2B). The hose 109 can be in fluid communication with the pump inlet 104; and the handle 111 can be operable to generate a vacuum within the hose 109, such as via a rocking or other repeatable motion, to thereby generate suction within the pump inlet 104. The valve 113 can be a manually, electrically, or hydroelectrically operable ball valve, a gate valve, a butterfly valve, or other types of valves. The valve 113 can be in an open position to enable a vacuum to be generated within the pump inlet 104 and can be in a closed position to prevent water from entering the hose 109, such as when the pump device 102 begins drawing water into the pump inlet 104 unassisted by the priming system 107.

The pump device 102 can include a pump outlet 106 (FIGS. 2A-2B). The pump outlet 106 can be connected to and in fluid communication with a manifold assembly 108. In one example, as shown in FIGS. 2A-2B, the pump inlet 104 can be located orthogonally to the pump outlet 106, such as to help the decrease the overall length or width of the mobile pump system 100. The manifold assembly 108 can be configured to transfer water from the pump outlet 106 to at least two outlet valves. For example, the mobile pump system 100 can include a manifold assembly 108 including, but not limited to, a first conduit 110, a first outlet valve 112, a second conduit 114 (FIG. 1), a filtration system 116 defining an intake 118 (FIGS. 1 and 2B) and an outlet 120 (FIGS. 1 and 2B), and a second outlet valve 122 (FIG. 1). The first conduit 110 can be a pipe, a rigid or semi-rigid hose, or otherwise a tubular or hollow structure configured to establish fluid communication between the pump outlet 106, the first outlet valve 112, and the second conduit 114.

In a non-limiting example, the first conduit 110 can be generally T-shaped, at least in that the first conduit can include a first portion 126 (FIG. 2A) extending concentrically with the pump outlet 106 and a second portion 128 (FIG. 2A) extending orthogonally to the pump outlet 106, such as to help decrease the overall width of the mobile pump system 100. Any of the pump outlet 106, the first conduit 110, or the first outlet valve 112 can include one or more of a flange, a fitting, a gasket, a plurality of fasteners, or any other feature or device suitable to fixedly or removably couple the first conduit 110 to the pump outlet 106, the first outlet valve 112, and the second conduit 114. In a non-limiting example, such as shown in FIG. 2A, the first conduit 110 can be welded to the second conduit 114.

In a non-limiting example, the first conduit 110 of the manifold assembly 108 can include a first device 115 (FIG. 1). The first device 115 can be, for example, but not limited to, a mechanically, electrically, or hydroelectrically operable: pressure regulator valve, pressure gauge, pressure reducing valve, pressure sustaining valve, any combination thereof, or other types of valves. In a non-limiting example, the first device 115 can be a pressure reducing and/or sustaining valve from Bermad®. The first device 115 can also be configured to monitor and provide telemetry data such as any of flow rate, water pressure, or a position of a valve of the first device 115 (e.g., open, closed, or a position therebetween) to a control system 166 (FIG. 2B) of the mobile pump system 100.

The first outlet valve 112 and the second outlet valve 122 can be a manually, remotely, electrically, or hydroelectrically operable ball valve, a gate valve, a butterfly valve, or other types of valves operable to selectively discharge water (e.g., allow or prevent the flow of water therethrough). In a non-limiting example, the first outlet valve 112 and the second outlet valve 122 can be configured to monitor and provide telemetry data, such as mechanically via a pressure gauge or flow meter included therewith or electronically via a sensor operable to measure any of flow rate, water pressure, or quantify a position of the valve (e.g., open, closed, or a position therebetween) in electrical communication with the control system 166. The second conduit 114 can be a pipe, a rigid or a semi-rigid hose, or otherwise a tubular or hollow structure configured to establish fluid communication between the first conduit 110 and the intake 118 of the filtration system 116. Any of the first conduit 110, the second conduit 114, or the intake 118 can include one or more of a flange, a fitting, a gasket, a plurality of fasteners, or any other feature or device suitable to fixedly or removably couple the second conduit 114 to the first conduit 110 and the intake 118.

In anon-limiting example, the second conduit 114 can include a central portion 130 (FIGS. 1-2A) and a distal portion 132 (FIGS. 1-2A). The central portion 130 can be a segment of the second conduit 114 extending parallel to and laterally offset from the pump inlet 104, the extension 105, and a longitudinal axis A1 (FIG. 1), such as to help the decrease the overall width of the mobile pump system 100. In a non-limiting example, the central portion 130 can include a second device 117 (FIG. 1). The second device 117 can be, for example, but not limited to, a mechanically, remotely, electrically, or hydroelectrically operable: pressure regulator valve, pressure gauge, pressure reducing valve, pressure sustaining valve, any combination thereof, or other types of valves, in a non-limiting example, the second device 117 can be a pressure reducing and/or sustaining valve from Bermad®. The second device 117 can also be configured to monitor and provide telemetry data such as any of flow rate, water pressure, or a position of a valve of the second device 117 (e.g., open, closed, or a position therebetween) to the control system 166 (FIG. 2B) of the mobile pump system 100. In a non-limiting example, the second device 117 (or the first device 115 or a third device 151) can prevent water from flowing therethrough unless the water pressure is at least 1 pound per square inch to about 220 pounds per square inch.

The distal portion 132 (FIG. 1) can be a segment of the second conduit 114 extending orthogonally to the central portion 130 and the longitudinal axis A1; and parallel to and laterally offset from the first portion 126 of the first conduit 110, such as to help reduce an overall length of the mobile pump system 100. In non-limiting example, the distal portion 132 can be coupled directly to the intake 118 of the filtration system 116. In other examples, such as shown in FIGS. 1-2A, the distal portion 132 can be coupled to an intake valve 134 of the manifold assembly 108 fluidly coupling the second conduit 114 to the intake 118.

The intake valve 134 can be similar to the first outlet valve 112 and the second outlet valve 122, in that the intake valve 134 can be a manually, remotely, electrically, or hydroelectrically operable ball valve, a gate valve, a butterfly valve, or other types of valves operable to selectively discharge water (e.g., allow or prevent the flow of water therethrough). In a non-limiting example, the intake valve 134 can be configured to monitor and provide telemetry data, such as mechanically via a pressure gauge or flow meter included therewith or electronically via a sensor operable to measure any of flow rate, water pressure, or quantify a position of the valve (e.g., open, dosed, or a position therebetween) in electrical communication with the control system 166. Any of the intake valve 134, the intake 118, or the distal portion 132 can include one or more of a flange, a fitting, a gasket, a plurality of fasteners, or any other feature or device suitable to fixedly or removably couple the intake valve 134 to the intake 118 or the distal portion 132 to the intake valve 134 or the intake 118.

The filtration system 116 can be configured to filter (e.g., capture or retain) various contaminants, such as any of weeds, seeds, dirt or sand particles, or other debris from water flowing between the intake 118 and the outlet 120; and perform an automated and automatic filter-cleaning procedure without any reduction in flow rate or water pressure at the outlet 120. For example, the filtration system 116 can be an Amiad® Filomat Series self-cleaning water filtration system, such as one of models M104XLP, M106XLP, M108LP, or M110P. In one example, such as shown in FIG. 2B, the filtration system 116 can include a body portion 136 establishing fluid communication between the intake 118 and the outlet 120. The body portion 136 can generally be a tubular or otherwise hollow structure housing or defining filtration componentry, such as any of a filter or filter assemblies, screens, nozzles, passageways, or any other hardware necessary to enable filtration and self-cleaning operations of the filtration system 116. In one example, such as shown in FIGS. 1A-2B, the body portion 136 can extend parallel to, and laterally offset from, the longitudinal axis A1, such as to help the decrease the overall length of the mobile pump system 100 by virtue of being positioned to extend parallel to the central portion 130 of the second conduit 114.

In other examples, the body portion 136 can be positioned at other angles relative to the longitudinal axis A1, or the mobile pump system 100 can include two, three, four, or other numbers of body portions 136 in fluid communication with the intake 118 and the outlet 120 and located at various angles to the longitudinal axis A1, such as to enable filtration system 116 to utilize multiple filters or filter assemblies to further improve the filtration capabilities (e.g., multiple pass filtration, higher flow rate, or higher pressure) of the filtration system 116. In some such examples, the filtration system 116 can be an Arniad® Filtomat MG110, MG112, or MG-114 self-cleaning filtration system.

The body portion 136 can define a first end 138 (FIG. 2B) and a second end 140 (FIG. 2B). The first end 138 can include a backflush outlet valve 142 (FIGS. 2A-29). The hackflush outlet valve 142 can a manually, electrically, or hydroelectrically operable ball valve, a gate valve, a butterfly valve, or other types of valves configured to selectively discharge contaminants or debris captured or retained by the filtration system 116. The hackflush hose 144 (FIGS. 2A-29) can be connected to the backflush outlet valve 142, such as to enable water and contaminants or debris discharged from the hackflush outlet valve 142 to be directed to a disposal area spaced away from the mobile pump system 100 when the backflush outlet valve 142 is in an open position.

In such an example, the backflush outlet valve 142 can be configured to automatically open to discharge seeds, weeds, dirt particles, or other debris and contaminants from the filtration system 116 to the backflush hose 144, such as in response to a signal received from a controller 146 (FIG. 1)

of the filtration system 116. For example, the controller 146 can be configured to monitor telemetry data associated with the filtration system 116, such as, but not limited to, a pressure differential between the intake 118 and the outlet 120, and thereby cause the backflush outlet valve to open if a measured pressure differential reaches a threshold valve, a flow rate of water passing through the filtration system 116, a cumulative or individual run time of the filtration system 116, or a number of backflush self-cleaning operations that the filtration system has performed. In a non-limiting example, the controller 146 can be made by Amiadt, such as configured to control operations of the Filtomat MG-110, MG112, or MG114 self-cleaning filtration systems. The controller 146 can be in electrical communication and receiving power from with the control system 166 and the power source 164, and thereby under the control of the control system 166, or the controller 146 can be a standalone controller receiving power from an integrated battery back, such as an AA or AAA battery back.

The filtration system 116 can be configured to capture or retain weed seeds, sand or dirt particles, or other contaminants falling within a defined size range. For example, a filter assembly 137 (FIG. 1) located within the body portion 136 can be configured to capture or retain particles measuring, but not limited to, about 80 microns to about 1000 microns, or about 1 micron to about 2000 microns. In a non-limiting example, the filter assembly 137 (FIG. 1) located within the body portion 136 can be configured to seeds measuring about, but not limited to, 0.5 millimeters to about 0.65 millimeters. In an additional non-limiting example, the filtration system 116 can be configured to capture or retain weed seeds, sand or dirt particles, measuring about 0.1 millimeters or more.

The second outlet valve 122 can be connected directly to, or can otherwise be in fluid communication with, the outlet 120 of the filtration system 116, In a non-limiting example, the manifold assembly 108 can include a third conduit 148 (FIGS. 1 and 2B). The third conduit 148 can be a pipe, a rigid or a semi-rigid hose, or a tubular or otherwise hollow structure configured to direct water discharged from the outlet 120 of the filtration system 116. Any of the second outlet valve 122, the outlet 120, or the third conduit 148 can include one or more of a flange, a fitting, a gasket, a plurality of fasteners, or any other feature or device suitable to fixedly or removably couple the second outlet valve 122 to the outlet 120 or the third conduit 148 to the second outlet valve 122, in one example, the third conduit 148 can form a generally curved or elbow-shaped, such as to direct water from the outlet 120 in a direction in orthogonal to the outlet 120 and parallel to the first outlet valve 112. In anon-limiting example, the first outlet valve 112 can include an outlet fitting 150 (FIG. 2A). The third conduit 148 and the outlet fitting 150 can be configured to engage various fittings, pipes, hoses, conduits, or other tubular structures deployable to an agricultural site, connectable to an irrigation system, or connectable to other agricultural implements to establish fluid communication therebetween.

In a non-limiting example, the first device 115 can be located downstream of the first outlet valve 112, such as coupled directly to the outlet fitting 150 or otherwise in fluid communication with the outlet fitting 150 such as via a conduit, hose, or other hollow structure extending therefrom, such as to monitor or reduce the pressure or flow rate of water exiting the first outlet valve 112 downstream of the first outlet valve 112. In a non-limiting example, the manifold assembly 108 of the mobile pump system 100 can include the third device 151 (FIG. 1). The third device 151 can be a mechanically, electrically, or hydroelectrically operable: pressure regulator valve, pressure gauge, pressure reducing valve, pressure sustaining valve, any combination thereof, or other types of valves. In a non-limiting example, the third device 151 can be a pressure reducing and/or sustaining valve from Bermad®. The third device 151 can also be configured to monitor and provide telemetry data such as any of flow rate, water pressure, or a position of a valve of the third device 151 (e.g., open, closed, or a position therebetween) to the control system 166 (FIG. 2B) of the mobile pump system 100.

The third device 151 can be located downstream of the second outlet valve 122, such as coupled directly to the second outlet valve 122, the third conduit 148, or an additional conduit, hose, or other hollow structure extending therefrom, such as to monitor or reduce the pressure or flow rate of water exiting the second outlet valve 122 downstream of the filtration system 116. In view of the foregoing description, the first outlet valve 11:2 and the second outlet valve 122 can be selectively controlled by a user to control the pressure or the flow rate of water passing therethrough or passing proximally thereby. For example, if the first outlet valve 112 is in a fully open position, and the second outlet valve 122 and the intake valve 134 are in a closed position, the first outlet valve can discharge unfiltered water a rate dictated by a speed of the pump device 102 (e.g., a first flow rate), such as about 1800 gallons per minute in a non-limiting example.

If the first outlet valve 112 is in a fully closed position, and the second outlet valve 122 and the intake valve 134 are in in a fully open position, the second outlet valve 122 can discharge unfiltered water a rate dictated by a speed of the pump device 102, such as about 1800 gallons per minute in a non-limiting example. If all of the first outlet valve 112, the second outlet valve 122, and the intake valve 134 are in an open position, the first outlet valve 112 and the second outlet valve 122 can each discharge water at a rate of 900 gallons per minute concurrently, such as to discharge unfiltered water for flood irrigation and filtered water for sprinkler or drip irrigation at a similar flow rate. However, any of the first outlet valve 112, the first device 115, the second device 117, the second outlet valve 122, or the third device 151 discussed above can further be selectively controlled by a user to control the pressure or the flow rate of water passing therethrough or passing proximally thereby.

For example, the first device 115, the second device 117, or the third device 151 can be configured to reduce the flow rate exiting the first outlet valve 112, or the second outlet valve 122, respectively, to second (e.g., lesser) flow rates such as, but not limited to, about 100 gallons per minute to about 300 gallons per minute, about 300 gallons per minute to about 500 gallons per minute, or about 500 gallons per minute to about 800 gallons per minute. Such a second flow rate is thereby not dictated by speed of the pump device 102, and can be user selected, such as to configure to the mobile pump system 100 to discharge lower pressure filtered water from the second outlet valve 122, such as for a drip irrigation system, while discharging higher pressure unfiltered water through the first outlet valve 112, such as for floor irrigation or water transfer purposes.

Any of the extension 105, the first conduit 110, the second conduit 114, the third conduit 148, the outlet fitting 150, or other components of the mobile pump system 100 can be made from, but not limited to, iron, steel, aluminum, or other metals via, but not limited to casting, metallic molding, or machining. In other examples, the extension 105, the first conduit 110, the second conduit 114, the third conduit 148, the outlet fitting 150, or other components of the mobile pump system 100 can be made from rubber, plastics, PVC (polyvinyl chloride), or other materials. The material of the extension 105, the first conduit 110, the second conduit 114, the third conduit 148, or the outlet fitting 150 can be configured (e.g., chosen) based on the water pressure to be contained by the manifold assembly 108.

The mobile pump system 100 can include a frame 154. The frame 154 can be a structure, such as a skid mount, configured to be coupled to or otherwise support and locate any or all of various components of the mobile pump system 100, such that the frame 154 forms a mobile or otherwise transportable platform. For example, the frame 154 can include a plurality of hollow or solid beams, such as sections of angle or flat bar stock arranged to conform to and maintain a position of various components relative to one another. Such beams can be, for example, sections of cylindrical, square, rectangular, or other shapes of tubing, or sections of angle, U or L channel, or flat bar stock. The frame 154 can be collectively formed from various numbers of beams, such as, but not limited to, 1, 2, 3, 4, 5, or 6 beams. The frame 154 can form a variety of three-dimensional shapes. In a non-limiting example, the frame 154 can be generally rectangular or cuboidal in shape, A first beam 155 (FIG. 1) of the frame 154 can define the longitudinal axis A1.

The first outlet valve 112 can be coupled to the first beam 155 of the frame 154 with a plate 156 (FIG. 2A), such as to help support, and reduce relative movement between, the first outlet valve 112, the first conduit 110, and the second conduit 114, and the pump device 102. The plate 156 can form various three-dimensional shapes. In a non-limiting example, the mobile pump system 100 can include a trailer 160 (FIG. 2A). The frame 154 can be coupled to the trailer 160. For example, the frame 154 can be fixedly coupled to the trailer 160 (FIG. 2A) with a plurality of bolts or other types of fasteners extending through a each of a pair of skid rails 159 (FIG. 2A) of the frame 154. The skid rails 159 can be hollow or solid beams, such as sections of angle, C or L channel, or flat bar stock, or cylindrical, square, rectangular, or other shapes of tubing extending parallel to and laterally offset from the longitudinal axis A1.

The trailer 160 can be an existing trailer, such as a flatbed trailer onto which the frame 154 supporting the mobile pump system 100 can be placed, or the trailer 160 can be a custom trailer, such as shaped to support, conform to, and maintain a position of various components of the mobile pump system 100 relative to one another. The trailer 160 can define a fuel tank 161 (FIG. 2B), such as configured to store gasoline or diesel fuel for a power source 164 (FIG. 29). In such examples, the fuel tank 161 can be located underneath the frame 154 when the frame 154 is coupled to the trailer 160. In other examples, the fuel tank 161 can be a storage vessel coupled to the frame 154 in various locations; or can be located externally to the mobile pump system 100. The trailer 160 can be hitched to a vehicle, or the frame 154 of the mobile pump system 100 can be positioned on or within a vehicle, to facilitate convenient transportation of the mobile pump system 100 to various locations. In a non-limiting example, the trailer 160 can also include one or more outriggers 162 (FIG. 2A) selectively deployable by a user, such as to help increase the stability of the trailer 160 when the trailer 160 is located on uneven, soft, or otherwise unstable terrain. The trailer 160 can include one, two, three, four, or other numbers of outriggers 162 positioned at various locations on the trailer 160.

Figure 3:
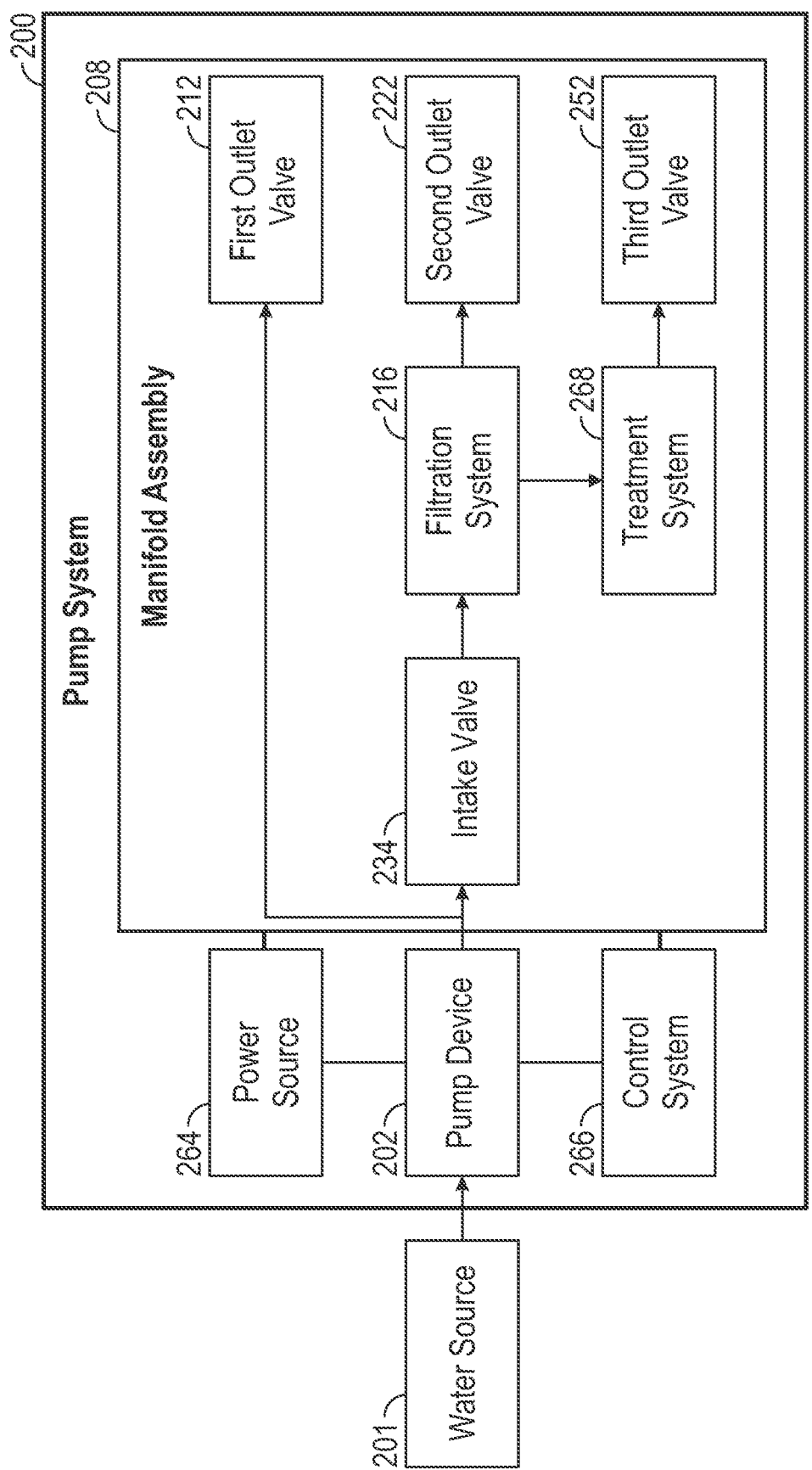
FIG. 3 illustrates an example schematic diagram of a mobile pump system.

The mobile pump system 100 can include a power source 164 (FIG. 2B). The power source can be configured to, such as by including any hardware necessary to, power any of various mechanical or electrical components of the mobile pump system 100. For example, the power source 164 can be configured to provide power, but not limited to, the pump device 102, the first outlet valve 112, the first device 115, the second outlet valve 122, the second device 117, the intake valve 134, the filtration system 116, the controller 146, the third device 151, the control system 166 (FIG. 2B), a third outlet valve 252 (as shown in FIG. 3), or a treatment system 268 (FIG. 3), As such, the power source 164 can be configured based upon electrical power requirements of demands of various components of the mobile pump system 100. In a non-limiting example, the power source 164 can be configured to generate about 10 kilowatts of electrical energy to about 100 kilowatts of energy.

The power source 164 can be a gasoline, diesel, natural gas, fuel cell, or any fossil fuel powered engine, such as configured as a standalone engine or as part of an electrical generator, or an electrically driven engine, in one example, the power source 164 can include a Cummins® OSB6.7 FOR AGRICULTURE (TIER 3) engine. In a non-limiting example, the power source 164 and the pump device 102 be configured to mechanically drive the pump device 102 directly, such as via a rotatable shaft or PTO (power takeoff) coupling an engine or electric motor of the power source 164 to a corresponding input of the pump device 102. In a non-limiting example, the power source 164 can include an electrical generator configured to generate sufficient electrical power to power an electric motor of the pump device 102, such as to indirectly power the pump device 102.

The power source 164 can be coupled to the frame 154, such that the mobile pump system 100 can include a self-sufficient dedicated power source entirely supported by the frame 154. In a non-limiting example, the power source 164 can be coupled to and supported by the frame 154 and the trailer 160. In an additional non-limiting example, the power source 164 can include at least two gasoline, diesel, natural gas, fuel cell, or any fossil fuel powered or electrically driven engines. For example, a first engine of the at least two engines of the power source 164 can be configured drive the pump device and provide power to the control system 166; and a second engine of the at least two engines of the power source 164 can be configured to power the filtration system 116 or the treatment system 268 (as shown in FIG. 3).

The power source 164 can be configured to monitor and provide telemetry data associated with the power source such as any of, but not limited to, engine speed (in revolutions per minute), engine oil temperate, engine coolant temperature, total engine run time, engine run time associated with an individual run period, electrical energy output, or fuel level, such as of the fuel tank 161. In a non-limiting example, the power source 164 can provide telemetry data to the control system 166 a GEOTAB® Go9 vehicle tracking device.

The mobile pump system 100 can include the control system 166 (FIG. 2B). The control system 166 can be configured to control any of various operations of the mobile pump system 100. For example, the control system 166 can include processing circuitry in electrical communication with, but not limited to, the pump device 102, the first outlet valve 112, the first device 115, the second outlet valve 122, the second device 117, the intake valve 134, the filtration system 116 via the controller 146, the third device 151, the controller 146, the third outlet valve 252 (FIG. 3), or the treatment system 268 (FIG. 3) to thereby monitor telemetry data associated therewith. The control system 166 can configured to facilitate wireless communication between an external device (e.g., a mobile phone, electronic tablet, or a laptop or desktop computer) and the mobile pump system 100. For example, the control system 166 can include a communication module capable of wireless (e.g., network) communication, such as to transmit or receive data via near-field communication (NFC), Bluetooth (e.g., Bluetooth Low Energy), Wi-Fi, 3GPP LTE, or any other wireless communication protocol.

Such a communication module can include a network interface card, a wireless communication interface, an optical transceiver, a radio frequency transceiver, or any other type of device that can send and receive information. The control system 166 can be configured to transfer or store telemetry data on an internal memory or on a remote data repository, such as a cloud server or an external device in wireless communication with the control system 166. The control system 166 can include a control panel 167 (FIG. 2B), The control panel 167 can include one or more buttons, switches, gauges, dials, or other user input devices or instrument operable to control or monitor telemetry data associated with various components of the mobile pump system 100, in a non-limiting example, the control panel 167 can include a LOFA® or a Murphy® engine control panel. In anon-limiting example, the control system 166 can be completely or partially realized by a smart engine control panel in electrical communication with any of various electronic components of the mobile pump system 100. In a non-limiting example, the control system 166 can be completely or partially realized by a standalone or otherwise independent computer system in electrical with any of various electronic components of the mobile pump system 100.

The control panel 167 can be coupled to the frame 154 or the trailer 160. The control system 166 can include a battery 169. The battery 169 can be configured to, for example, but not limited to, power various operations of the control system 166 when an internal-combustion engine or electric motor of the power source 164 is inactive; or provide power to a starter of an internal combustion engine or other electrical components of the mobile pump system 100. The control system 166 can further be configured to enable remote user control of various operations of the mobile pump system 100. For example, the control system 166 can facilitate, such as via one or more user inputs to an external device in wireless communication with the control system 166, remote activation, deactivation, or rpm (revolutions per minute) control of the pump device 102, positional control over the first outlet valve 112, the second outlet valve 122, the intake valve 134, the third outlet valve 252 (FIG. 3), or control over various operations of the filtration system 116, the first device 115, the second device 117, the third device 151, or the treatment system 268 (FIG. 3).

In a non-limiting example, the control system 166 can be configured to monitor data associated with a geospatial location or prevailing weather conditions at a site at which the mobile pump system 100 is located. In a non-limiting example, the control system 166 can include a GEOTAB® Go9 vehicle tracking device or other devices operable to transmit, receive, or retrieve data relating to weather conditions or global positioning system data. The control system 166 can be configured to perform various operations based upon data associated with prevailing weather conditions at a site at which the mobile pump system 100 is located. For example, the control system 166 can be configured to detect if it is raining, such as by retrieving data from a cloud service or server, or an external device, and in response, deactivate the power source 164 and thereby the pump device 102.

In another non-limiting example, the control system 166 can be configured to detect if it is above a threshold temperate at the location at which the mobile pump system 100 is located, such as by retrieving data from a cloud service or server, or an external device, and in response, activate the power source 164 and thereby the pump device 102. In another example, the control system 166 can include a wind speed sensor configured to measure windspeed at the location at which the mobile pump system 100 is located, and in response, deactivate the power source 164 and thereby the pump device 102 if the prevailing wind reaches a threshold speed.

FIG. 3 illustrates an example schematic diagram of a mobile pump system 200. FIG. 3 is discussed with regard to the mobile pump system 100 shown in, and described with regard to, FIGS. 1-2B above. In addition to the components shown in and described with regard to FIGS. 1-2B, the mobile pump system 200 can include the treatment system 268. The treatment system 268 can in fluid communication with the filtration system 216, and can be connected to and located within, the frame 154. For example, the treatment system 268 can be located downstream of the outlet 120 (FIGS. 1 and 2B) of the filtration system 116. In a non-limiting example, a second intake valve, such as similar to any of the intake valve 134, the first outlet valve 112 or the second outlet valve 122 can be positioned between the outlet 120 of the filtration system 116 and an intake of the treatment system 268 such that water entering the treatment system 268 can be selectively controlled by a user.

The treatment system 268 can include any suitable system for disinfecting water from pathogens, bacteria, microbes, algae, viruses, fungus and fungal spores, and other biological contaminants. The treatment system 268 can be configured to deliver safe water within FSMA guidelines, such as for drinking, sprinkler, furrow, flood, or other irrigation systems without utilizing any chemical additives. The treatment system 268 can be configured to sanitize, sterilize, or otherwise disinfect the filtered irrigation water prior to disposition through the first outlet valve 212 or the second outlet valve 222. In one example, the treatment system 268 can include an ultraviolet (UV) light system. The UV light system can be a flow-through system wherein the filtered irrigation water can be exposed to UV light as it travels through the UV light system. The UV light can be any wavelength that sterilizes the filtered irrigation water. For example, the UV light system can emit shortwave UVC radiation at a wavelength of 254 nm to produce highly effective sterilization power.

In another example, the treatment system 268 can include an ozone generator to disinfect the filtered irrigation water by ozonolysis. Ozonolysis can also break down organic contaminants in the filtered irrigation water such as herbicides, pesticides, and fungicides that can interfere with organic farming. In a nonlimiting example, the ozone generator can include a UV light system that emits UVC radiation at a wavelength of 185 nm produce ozone. As another nonlimiting example, the ozone generator can include the model 01 by Pacific Ozone, the Nano by Absolute Ozone, or the OZ8PC20 by Ozotech®. The ozone generator can infuse ozone into the filtered irrigation water at a level sufficient for sterilization. In some embodiments, the ozone can be mixed with the filtered irrigation water with a mixer to enhance ozonolysis. The treatment system 268 can be configured to deliver safe water within FSMA (Food Safety Modernization Act) guidelines, such as for drinking, sprinkler, furrow, flood, or other irrigation systems without utilizing any chemical additives.

In the operation of some examples, a user can interact with the control system 266 to activate the power source 264 or the pump device 202. For example, a user can cause an external device (e.g., a mobile phone, electronic tablet, or a laptop or desktop computer) such as via one or more user inputs, to send a wireless signal receivable by the control system 266, or a user can manually depress or otherwise operate one or more buttons, switches, or other user input devices of the control system 266, such as of the control panel 167 shown in FIG. 2B. In a non-limiting example, the mobile pump system 200 does not include the power source 264, or a power source sufficient to electrically power all operations of the mobile pump system 200; and a user can first establish an electrical connection between the control system 266 and an external power source, such as an external electrical generator or an electrical output of a tractor, truck, other vehicles, or a building, In another non-limiting example, the control system 266 includes a battery, such as the battery 169 shown in FIG. 2B; and the battery 169 can provide power to the control system 266, such as when the power source 264 is inactive or is otherwise not generating sufficient electrical energy to power the control system 266.

Once the pump device 202 is provided with power in the form of electrical energy, the pump device 202 can begin generating suction to draw water into the pump device 202 from a water source 201 in fluid communication with the pump device 202, such as from a well, a drainage ditch, a pond or river, or a dedicated reservoir or water storage receptacle, such as a water tank, to in turn deliver pressurized water to the manifold assembly 208. In some embodiments, the initial suction to draw the water into the pump device 202 may be provided by the priming system 107. Once primed, the pump device 202 can continue to pump the water from the water source 201 into the intake valve 234.

A user can selectively control the flow rate and the water pressure of water delivered to the manifold assembly 208 by the pump device 202, such as via one or more user inputs to an external device in wireless communication with the control system 266, or to one or more user input devices of the control system 266, such as of the control panel 167 shown in FIG. 2B. For example, a lower flow rate, such as between, but not limited to, about 1 gallon per minute to about 1000 gallons per minute, can be desirable if the mobile pump system 200 is in fluid communication with a drip irrigation system. A higher flow rate, such as between about, but not limited to, about 1001 gallons per minute to about 11000 gallons per minute, can be desirable if the mobile pump system 200 is in fluid communication with a flood or sprinkler irrigation system, or if the mobile pump system 200 is to be used for transferring water between water sources, such as between a lake, river, or pond and a water storage tank.

The first outlet valve 212 can be operated by a user to selectively allow or prevent the discharge of unfiltered water therefrom, such as at a first flow rate corresponding to a speed, such as quantified in revolutions per minute, of the pump device 102 shown in FIG. 2B. For example, a user can manually turn, slide, or otherwise engage the first outlet valve 212 to open or close the first outlet valve 212, or the first outlet valve 212 can be electrically opened or closed, such as via one or more user inputs to an external device in wireless communication with the control system 266. The first outlet valve 212 can be in an open position to enable the output of unfiltered water therethrough to a variety of destinations. For example, the unfiltered water can be transferred into a water storage receptable, delivered directly into a field to a crop, pumped into to a flood irrigation system, pumped into other agricultural implements, or used for other uses on an agricultural site or farm. The first outlet valve 212 can be in a closed position to direct unfiltered water exclusively to the intake valve 234 or the filtration system 216.

The second outlet valve 222 can be operated by a user to selectively allow or prevent the discharge of filtered water therefrom via the filtration system 116, such as at a second pressure equal to or less than the first flow rate discussed above. For example, a user can manually turn, slide, or otherwise engage the intake valve 234 or the second outlet valve 222 to open or close the intake valve 234 or the second outlet valve 222, or the intake valve 234 or the second outlet valve 222 can be electrically opened or closed, such as via one or more user inputs to an external device in wireless communication with the control system 266. The intake valve 234 can be in an open position to enable to flow of unfiltered water therethrough into the filtration system 216. The intake valve 234 can be in a closed position if the first outlet valve 212 is open to prevent water from entering the filtration system 116 and to thereby cause the mobile pump system 200 to output only unfiltered water.

In a non-liming example, the discharge of filtered water through the second outlet valve 222 can be further controlled by any of the second device 117 or the third device 151, such as to reduce or limit a flow rate or water pressure of filtered water exiting the second outlet valve 122, or the outlet 120 of the filtration system 116. The second outlet valve 222 can be in an open position to enable the output of filtered water therethrough to a variety of destinations. For example, the filtered water exiting the filtration system 216 through the second outlet valve 222 can be transferred into a water storage receptacle, delivered directly into a field to a crop, pumped into to a drip sprinkler system, pumped into a sprinkler irrigation system, pumped into furrow irrigation system, pumped into a chemical deployment system, pumped into a fertilizer deployment system, pumped into other agricultural implements, or used for other uses on an agricultural site or farm.

In a non-limiting example, the manifold assembly 208 can further include the third outlet valve 252. The third outlet valve 252 can be operated by a user to selectively allow or prevent the discharge of sanitized and filtered water therefrom via the treatment system 268 and the filtration system 116. The third outlet valve 252 can be similar or to different to the second outlet valve, at least in that the third outlet valve 252 can be a can be a manually, remotely, electrically, or hydroelectrically operable ball valve, a gate valve, a butterfly valve, or other types of valves operable to selectively discharge water (e.g., allow or prevent the flow of water therethrough). For example, a user can manually turn, slide, or otherwise engage the third outlet valve 252 to open or close the third outlet valve 252, or the third outlet valve 252 can be electrically opened or closed, such as via one or more user inputs to an external device in wireless communication with the control system 266.

In a non-limiting example, the third outlet valve 252 can be configured to monitor and provide telemetry data, such as mechanically via a pressure gauge or flow meter included therewith or electronically via a sensor operable to measure any of flow rate, water pressure, or quantify a position of the valve (e.g., open, closed, or a position therebetween) in electrical communication with the control system 266. The third outlet valve 252 can be in fluid communication with the treatment system 268. For example, the third outlet valve 252 can be connected or coupled to an outlet of the treatment system 268 such that filtered and sanitized water exiting the treatment system 268 can flow through the third outlet valve 252 if the third outlet valve 252 is in an open position. This can enable a user to selectively discharge filtered and sanitized water from the at least the third outlet valve 252 of the mobile pump system 200 to at least two different destinations concurrently, such as any of the destinations for filtered water described above.

In an alternative non-limiting example, the second outlet valve 222 can also be configured to selectively discharge sanitized and filtered water. In such an example, the second outlet valve 222 can be in fluid communication with the treatment system 268. For example, the second outlet valve 222 can be connected or coupled to an outlet of the treatment system 268 such that filtered and sanitized water exiting the treatment system 268 can flow through the second outlet valve 222 if the second outlet valve 222 is in an open position. In turn, the third outlet valve 252 can be in fluid communication with the second outlet valve 222. For example, the third outlet valve 252 can be connected or coupled to the second outlet valve 222, such that sanitized and filtered water can flow through the second outlet valve 222 to the third outlet valve 252 if the second outlet valve 222 is in an open position.

Such an alternative example can allow a user to selectively discharge sanitized and filtered water from the mobile pump system 200 to at least two different destinations concurrently, such as any of the destinations for filtered water described above. The discharge of sanitized or filtered water through the third outlet valve 252 can be further controlled by any of the second device 117 or the third device 151 shown in FIG. 1, such as to reduce the flow rate and water pressure of filtered water exiting the filtration system 216 or the treatment system 268.

Figure 4:
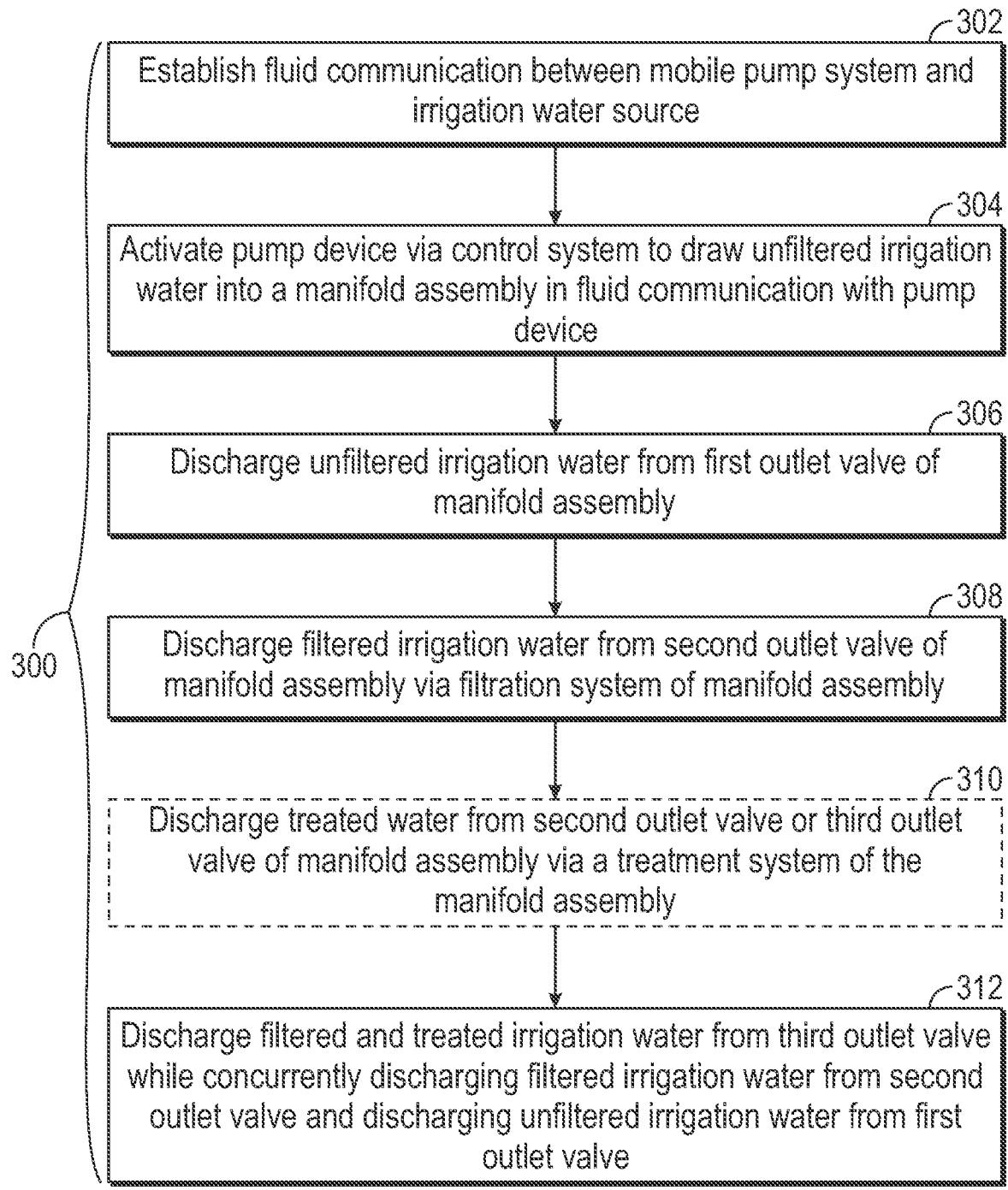
FIG. 4 illustrates an example flow chart of a method of using a mobile pump system.

FIG. 4 illustrates an example flow chart of a method 300 of using a mobile pump system. Any of the above examples of the pump systems 100-200 shown in and described in FIGS. 1-3 above can be used in the method 300 of using a mobile pump system. The discussed steps or operations can be performed in parallel or in a different sequence without materially impacting other operations. The method as discussed includes operations that can be performed by multiple different actors, devices, and/or systems. It is understood that subsets of the operations discussed in the method can be attributable to a single actor device, or system, and could be considered a separate standalone process or method.

The method can include operation 302. The operation 302 can include establishing fluid communication between the mobile pump system and an irrigation water source. For example, a user can connect a first end of a hose to an inlet of a pump device of the mobile pump system and deploy the hose such that a second end of the hose opposite the first end is submerged or is otherwise in contact with water located in a water source such as a lake, river, pond, or a dedicated water storage receptacle such as a water storage tank.

The operation 302 can include first connecting the first outlet valve to a water storage receptacle and connecting the second outlet valve to an agricultural drip or sprinkler irrigation system. For example, a user can connect a first end of a first hose the first outlet valve, such as to a fitting thereof, and position a second end of the first hose opposite the in, or in contact with a fitting of, a water source such as a lake, river, pond, or a dedicated water storage receptacle such as a water storage tank.

The method 300 can include operation 304, The operation 304 can include activating a pump device via a control system to draw unfiltered irrigation water into a manifold assembly in fluid communication with the pump device. For example, a user can cause an external device (e.g., a mobile phone, electronic tablet, or a laptop or desktop computer) such as via one or more user inputs, to send a wireless signal to the control system, or a user can manually depress or otherwise operate one or more buttons, switches, or other user input devices of the control system to cause the pump device to draw in water from a water source.

The method 300 can include operation 306. The operation 306 can include discharging the unfiltered irrigation water from a first outlet valve of the manifold assembly. For example, a user can manually turn, slide, or otherwise engage the first outlet valve to open or the first outlet valve, or the first outlet valve can be electrically opened or closed, such as via one or more user inputs to an external device in wireless communication with the control system. In some examples, the operation 306 can include closing an inlet valve in fluid communication with the first outlet valve and a filtration system of the mobile pump system. For example, a user can manually turn, slide, or otherwise engage the first outlet valve to close the inlet valve, or the inlet valve can be electrically opened or closed, such as via one or more user inputs to an external device in wireless communication with the control system.

The operation 306 can include remotely monitoring telemetry data associated with one or more of the power source, the pump device, the filtration system, geospatial location, prevailing weather conditions, the first outlet valve, or the second outlet valve. For example, a user can interact with an external device in wireless communication with the control system to view one or more of a position of, or a flow rate of water passing through, a pressure of water within the first outlet valve, the second outlet valve, a first, second, or third conduit of the manifold assembly, a first, second, or third device of the manifold assembly, or other telemetry data associated with a power source, the filtration system, a geospatial location of the mobile pump system, or prevailing weather conditions of a site at which the mobile pump system is located.

The method 300 can include operation 308. The operation 308 can include discharging filtered irrigation water from a second outlet valve of the manifold assembly via a filtration system of the manifold assembly. For example, a user can manually turn, slide, or otherwise engage the second outlet valve to open or close the second outlet valve, or the second outlet valve can be electrically opened or closed, such as via one or more user inputs to an external device in wireless communication with the control system of the mobile pump system. In some examples, the operation 306 and the operation 308 can be performed or otherwise carried out concurrently, such as by opening the first outlet valve and the second outlet valve and closing an inlet valve in fluid communication with a filtration system of the mobile pump system. The operation 308 can include retaining or capturing seeds via the filtration system. For example, the filtration system can be configured to filter out seeds defining a diameter greater than or equal to about 0.10 millimeters.

The method 300 can include operation 310. The operation 310 can include wherein discharging the filtered irrigation water from the second outlet valve of the manifold assembly includes discharging filtered and sanitized irrigation water from the second outlet valve via a treatment system of the manifold assembly. For example, the second outlet valve can be in fluid communication with the treatment system to allow filtered and sanitized water exiting the treatment system to flow through the second outlet valve if the second outlet valve is in an open position. In a non-limiting, example, the operation 308 can include discharging the unfiltered irrigation water from the first outlet valve including discharging the unfiltered water at a first flow rate and wherein discharging the filtered irrigation water from the second outlet valve includes discharge the filtered water at a second flow rate.

For example, a user can selectively control the flow rate and the water pressure of irrigation water delivered to the manifold assembly, such as by operating the first outlet valve and the second outlet valve, varying a speed (such as in revolutions per minute) of the pump device, by one or more user inputs to an external device in wireless communication with the control system, by one or more user inputs to one or more user input devices of the control system such as a control panel, via a first device fluid communication with the first outlet valve, or via a second or a third device in fluid communication with the second outlet valve.

The method 300 can include operation 312, The operation 312 can include discharging the filtered irrigation water from a third outlet valve; and wherein discharging the filtered irrigation water from a third outlet valve is performed concurrently with discharging the filtered irrigation water from the second outlet valve and discharging the unfiltered irrigation water from the first outlet valve.

For example, a user can manually turn, slide, or otherwise engage the third outlet valve to open or close the third outlet valve, or the third outlet valve can be electrically opened or closed, such as via one or more user inputs to an external device in wireless communication with the control system. In such an example, the third outlet valve can be in fluid communication with an outlet of a treatment system to allow filtered water to flow through the second outlet valve and sanitized and filtered water to flow through the third outlet valve if the second outlet valve and the third outlet valve are each in an open position.

The foregoing systems and devices, etc. are merely illustrative of the components, interconnections, communications, functions, etc. that can be employed in carrying out examples in accordance with this disclosure. Different types and combinations of sensor or other portable electronics devices, computers including clients and servers, implants, and other systems and devices can be employed in examples according to this disclosure.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventor also contemplates examples in which only those elements shown or described are provided.

Moreover, the present inventor also contemplates examples using any combination or permutation of those elements shown or described (or one or more aspects thereof), either with respect to a particular example (or one or more aspects thereof, or with respect to other examples (or one or more aspects thereof) shown or described herein. In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more," In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure.

This should not be interpreted as intending that an unclaimed disclosed feature is essential to any claim. Rather, inventive subject matter rna lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

EXAMPLES

The following, non-limiting examples, detail certain aspects of the present subject matter to solve the challenges and provide the benefits discussed herein, among others.

Example 1 is a mobile agricultural pump system, such as comprising: a frame; a pump device connected to the frame and defining a pump inlet and a pump outlet, wherein the pump device provides water to a first outlet valve and a filtration system; a manifold assembly supported by the frame and in fluid communication with the pump outlet, the manifold assembly including: a first outlet valve operable to selectively discharge unfiltered irrigation water from the pump outlet; a second outlet valve in fluid communication with the filtration system, wherein the second outlet valve is operable to selectively discharge filtered irrigation water; and a control system operably configured to be electrically connected to a power source, the pump device, and the filtration system.

In Example 2, the subject matter of Example 1 includes, wherein the pump device is a centrifugal pump or an axial pump.

In Example 3, the subject matter of Examples 1-2 includes, wherein the frame is a skid mount that provides a mobile platform for the mobile agricultural mobile pump system.

In Example 4, the subject matter of Examples 1-3 includes, wherein the frame is coupled to a trailer to facilitate motion of the mobile agricultural pump system over terrain.

In Example 5, the subject matter of Example 4 includes, wherein the mobile agricultural pump system includes a power source; and wherein the power source is an internal combustion electrical generator or an electric motor, the power source fixedly coupled to the frame and supported by the trailer.

In Example 6, the subject matter of Examples 1-5 includes, wherein the filtration system is a self-cleaning filtration system including a controller in electrical communication with the control system.

In Example 7, the subject matter of Example 6 includes, wherein the filtration system is configured to retain or capture seeds greater than or equal to about 0.10 millimeters in diameter.

In Example 8, the subject matter of Examples 6-7 includes, wherein the self-cleaning filtration system is configured to capture particles measuring between about 80 micrometers and about 1000 micrometers in diameter.

In Example 9, the subject matter of Examples 6-8 includes, wherein the manifold assembly includes a third outlet valve operable to selectively discharge filtered irrigation fluid via the filtration system.

In Example 10, the subject matter of Example 9 includes, wherein the manifold assembly includes a treatment system configured to sanitize water, and wherein the second outlet valve or the third outlet valve are operable to selectively discharge filtered or sanitized irrigation water via the filtration system and the treatment system.

In Example 11, the subject matter of Examples 1-10 includes, wherein the control system is configured to wirelessly communicate with an external device to facilitate remote user-control of one or more of the first outlet valve, the second outlet valve, the pump device, the filtration system, the treatment system, or a power source.

In Example 12, the subject matter of Example 11 includes, wherein the control system is configured to monitor telemetry data associated with one or more of the power source, the pump device, the filtration system, geospatial location, prevailing weather conditions, the first outlet valve, or the second outlet valve.

In Example 13, the subject matter of Examples 1-12 includes, wherein the pump device is configured to pump water at a rate of about 100 gallons per minute to about 11,000 gallons per minute.

Example 14 is a mobile agricultural pump system, such as comprising: a frame defining a longitudinal axis; a pump device connected to the frame and defining a pump inlet and a pump outlet, wherein the pump device provides water to a first outlet valve and a filtration system configured to retain or capture seeds; a manifold assembly supported by the frame and in fluid communication with the pump outlet, the manifold assembly including: a first outlet valve operable to selectively discharge unfiltered irrigation water from the pump outlet via a first conduit coupled to the pump outlet; a second outlet valve in fluid communication with the filtration system, the filtration system defining an intake and an outlet, wherein the intake is connected to the first conduit via a second conduit and wherein the outlet is coupled to the second outlet valve, wherein the second outlet valve is operable to selectively discharge filtered irrigation water; a third outlet valve in fluid communication with filtration system, wherein the third outlet valve is operable to selectively discharge filtered irrigation water; and a control system operably configured to be electrically connected to a power source, the pump device, and the filtration system.

In Example 15, the subject matter of Example 14 includes, wherein the first conduit includes a first portion extending orthogonally to the pump inlet and to the longitudinal axis.

In Example 16, the subject matter of Example 15 includes, wherein the second conduit includes a central portion extending parallel to and laterally offset from the longitudinal axis.

In Example 17, the subject matter of Example 16 includes, wherein the wherein the intake and the outlet of the filtration system extend orthogonally to the pump inlet, the pump outlet, and the longitudinal axis.

In Example 18, the subject matter of Example 17 includes, wherein a body portion of the filtration system extends parallel to and laterally offset from the longitudinal axis between the intake and the outlet, and wherein the filtration system is a self-cleaning filtration system.

In Example 19, the subject matter of Examples 17-18 includes, wherein the manifold assembly includes a treatment system configured to sanitize water, and wherein the second outlet valve or the third outlet valve are operable to selectively discharge filtered or sanitized irrigation water via the filtration system and the treatment system.

Example 20 is a method of using a mobile agricultural pump system, the method such as comprising: establishing fluid communication between the mobile pump system and an irrigation water source; activating a pump device via a control system to draw unfiltered irrigation water into a manifold assembly in fluid communication with the pump device; discharging the unfiltered irrigation water from a first outlet valve of the manifold assembly; and discharging filtered irrigation water from a second outlet valve of the manifold assembly via a filtration system of the manifold assembly.

In Example 21, the subject matter of Example 20 includes, wherein discharging the filtered irrigation water from the second outlet valve is performed concurrently with discharging the unfiltered irrigation water from the first outlet valve.

In Example 22, the subject matter of Example 21 includes, wherein the method further includes discharging the filtered irrigation water from a third outlet valve; and wherein discharging the filtered irrigation water from a third outlet valve is performed concurrently with discharging the filtered irrigation water from the second outlet valve and discharging the unfiltered irrigation water from the first outlet valve.

In Example 23, the subject matter of Examples 20-22 includes, wherein the method first includes connecting the first outlet valve outlet to a water storage receptacle and connecting the second outlet valve to an agricultural drip or sprinkler irrigation system.

In Example 24, the subject matter of Examples 20-23 includes, wherein discharging the filtered irrigation water from the second outlet valve of the manifold assembly includes discharging filtered and sanitized irrigation water from the second outlet valve via a treatment system of the manifold assembly.

In Example 25, the subject matter of Examples 20-24 includes, wherein the method first includes connecting the first outlet valve outlet to a water storage receptacle and connecting the second outlet valve to an agricultural irrigation system.

In Example 26, the subject matter of Examples 20-2.5 includes, wherein at least one of discharging the unfiltered irrigation water from the first outlet valve or discharging filtered irrigation water from the second outlet valve includes remotely monitoring telemetry data associated with one or more of a power source, the pump device, the filtration system, geospatial location, prevailing weather conditions, the first outlet valve, or the second outlet valve.

In Example 27, the subject matter of Example 21 includes, wherein discharging the unfiltered irrigation water from the first outlet valve includes discharging the unfiltered water at a first flow rate and wherein discharging the filtered irrigation water from the second outlet valve includes discharge the filtered water at a second flow rate.

Example 28 is a method of using a mobile agricultural pump system, the method consisting of: establishing fluid communication between the mobile pump system and an irrigation water source; activating a pump device via a control system to draw unfiltered irrigation water into a manifold assembly in fluid communication with the pump device; discharging the unfiltered irrigation water from a first outlet valve of the manifold assembly and discharging filtered irrigation water from a second outlet valve of the manifold assembly via a filtration system of the manifold assembly.

Example 29 is at least one inachine-readable medium including instructions that, when executed by processing circuitry, cause the processing circuitry to perform operations to implement of any of Examples 1-28.

Example 30 is an apparatus comprising means to implement of any of Examples 1-28.

Example 31 is a system to implement of any of Examples 1-28.

Example 32 is a method to implement of any of Examples 1-28.

What is claimed is:

1. A mobile agricultural pump system, comprising:
   a frame defining a longitudinal axis;
   a pump device connected to the frame and defining a pump inlet and a pump outlet, wherein the pump device is configured to provide water to a first outlet valve
   a filtration system configured to retain or capture seeds and receive water from the pump device, wherein the filtration system is downstream of the first outlet valve, wherein the filtration system includes an intake and a first outlet;
   a manifold assembly supported by the frame and in fluid communication with the pump outlet, the manifold assembly including:
   a treatment system configured to sanitize water of the filtration system;
   the first outlet valve operable to selectively discharge unfiltered irrigation water from the pump outlet via a first conduit coupled to the pump outlet, wherein the first outlet valve discharges unfiltered irrigation from the mobile agricultural pump system prior to the filtration system;
   a second outlet valve in fluid communication with the filtration system, wherein the second outlet valve is coupled to the first outlet of the filtration system, wherein the second outlet valve is operable to selectively discharge filtered irrigation water from the mobile agricultural pump system; and
   a third outlet valve in fluid communication with the filtration system and the treatment system, wherein the third outlet valve is operable to selectively discharge filtered irrigation water and sanitized irrigation water from the mobile agricultural pump system; and
   a control system operably configured to be electrically connected to at least one power source, the pump device, and the filtration system,
   wherein the at least one power source provides power to the pump device, filtration system, and the control system.

2. The system of claim 1, wherein the filtration system includes a first conduit and wherein the first conduit includes a first portion extending orthogonally to the pump inlet and to the longitudinal axis.

3. The system of claim 2, wherein the filtration system includes a second conduit and the second conduit includes a central portion extending parallel to and laterally offset from the longitudinal axis.

4. The system of claim 3, wherein the intake and the first outlet of the filtration system extend orthogonally to the pump inlet, the pump outlet, and the longitudinal axis.

5. The system of claim 4, wherein a body portion of the filtration system extends parallel to and laterally offset from the longitudinal axis between the intake and the first outlet, and wherein the filtration system is a self-cleaning backwash filtration system.

6. The system of claim 1, wherein the at least one power source provides power to the treatment system.

7. The system of claim 1, wherein the pump device is a centrifugal pump or an axial pump.

8. The system of claim 1, wherein the frame is a skid mount that provides a mobile platform for the mobile agricultural pump system.

9. The system of claim 1, wherein the frame is coupled to a trailer to facilitate motion of the mobile agricultural pump system over terrain.

10. The system of claim 9, wherein the at least one power source is an internal combustion engine or an electric motor, the at least one power source fixedly coupled to the frame and supported by the trailer.

11. The system of claim 1, wherein the filtration system comprises a self-cleaning backwash filter assembly.

12. The system of claim 11, wherein the filtration system is configured to retain or capture seeds greater than or equal to about 0.10 millimeters in diameter.

13. The system of claim 11, wherein the filtration system is configured to capture particles measuring between about 80 micrometers and about 1000 micrometers in diameter.

14. The system of claim 1, wherein the control system is configured to wirelessly communicate with an external device to facilitate remote user-control of one or more of the first outlet valve, the second outlet valve, the pump device, the filtration system, the treatment system, or the at least one power source.

15. The system of claim 14, wherein the control system is configured to monitor telemetry data associated with one or more of the at least one power source, the pump device, the filtration system, geospatial location, prevailing weather conditions, the first outlet valve, or the second outlet valve.

16. The system of claim 1, wherein the pump device is configured to pump water at a rate of about 100 gallons per minute to about 11,000 gallons per minute.

* * * * *